US009266682B1

(12) United States Patent
Pistacchio et al.

(10) Patent No.: US 9,266,682 B1
(45) Date of Patent: Feb. 23, 2016

(54) SLIDING FLOOR FOR CONTINUOUS MOVEMENT

(71) Applicants: Tommy George Pistacchio, Fresno, CA (US); Philip Joseph Sweet, Fresno, CA (US); Lynn A. Stuart, Vancouver, WA (US)

(72) Inventors: Tommy George Pistacchio, Fresno, CA (US); Philip Joseph Sweet, Fresno, CA (US); Lynn A. Stuart, Vancouver, WA (US)

( * ) Notice: Subject to any disclaimer, the term of this patent is extended or adjusted under 35 U.S.C. 154(b) by 0 days.

(21) Appl. No.: 14/209,992

(22) Filed: Mar. 13, 2014

Related U.S. Application Data

(60) Provisional application No. 61/785,630, filed on Mar. 14, 2013.

(51) Int. Cl.
*B65G 25/00* (2006.01)
*B65G 25/08* (2006.01)

(52) U.S. Cl.
CPC ...................................... *B65G 25/08* (2013.01)

(58) Field of Classification Search
CPC .............................. B65G 25/00; B65G 25/065
USPC ............. 198/750.1, 750.2, 750.5, 750.6, 751
See application file for complete search history.

(56) References Cited

U.S. PATENT DOCUMENTS

| | | | | |
|---|---|---|---|---|
| 4,184,587 A * | 1/1980 | Hallstrom | ................ | 198/750.2 |
| 4,474,285 A * | 10/1984 | Foster | ........................ | 414/525.1 |
| 4,580,678 A * | 4/1986 | Foster | ........................ | 414/525.1 |
| 4,793,468 A * | 12/1988 | Hamilton et al. | .......... | 198/750.5 |
| 5,193,661 A * | 3/1993 | Foster | ........................ | 198/750.5 |
| 5,222,593 A * | 6/1993 | Quaeck | ..................... | 198/750.5 |
| 5,340,264 A * | 8/1994 | Quaeck | ..................... | 414/525.9 |
| 5,383,548 A * | 1/1995 | Quaeck | ..................... | 198/750.6 |
| 5,427,229 A * | 6/1995 | Foster | ........................ | 198/750.7 |
| 5,431,523 A * | 7/1995 | Ferguson | .................. | 414/525.9 |
| 5,682,807 A * | 11/1997 | Mentink | ........................ | 91/530 |
| 5,839,568 A * | 11/1998 | Clark | ........................ | 198/750.5 |
| 5,934,445 A * | 8/1999 | Foster et al. | ............... | 198/750.5 |
| 7,380,652 B2 * | 6/2008 | Foster | ........................ | 198/750.5 |
| 7,886,891 B2 * | 2/2011 | Ranger et al. | ............ | 198/370.02 |
| 8,215,478 B2 * | 7/2012 | Almond | ..................... | 198/750.2 |

* cited by examiner

*Primary Examiner* — Douglas Hess
(74) *Attorney, Agent, or Firm* — North, Weber & Baugh LLP

(57) ABSTRACT

System and method for controlling a moving floor having multiple sliding slats, to produce a practically continuous load-moving force on a load carried on the apparatus. The slats are reciprocated back and forth by hydraulic cylinders, each of which controls a group of slats that are moved together. At any given time, a majority of the slats are moving together in the desired direction, and carry a load in this direction at a nearly uniform velocity. The remainder of the slats are moved in a reverse direction at the same time. The movement of the slats is controlled by an infinite piston positioning feedback system.

20 Claims, 5 Drawing Sheets

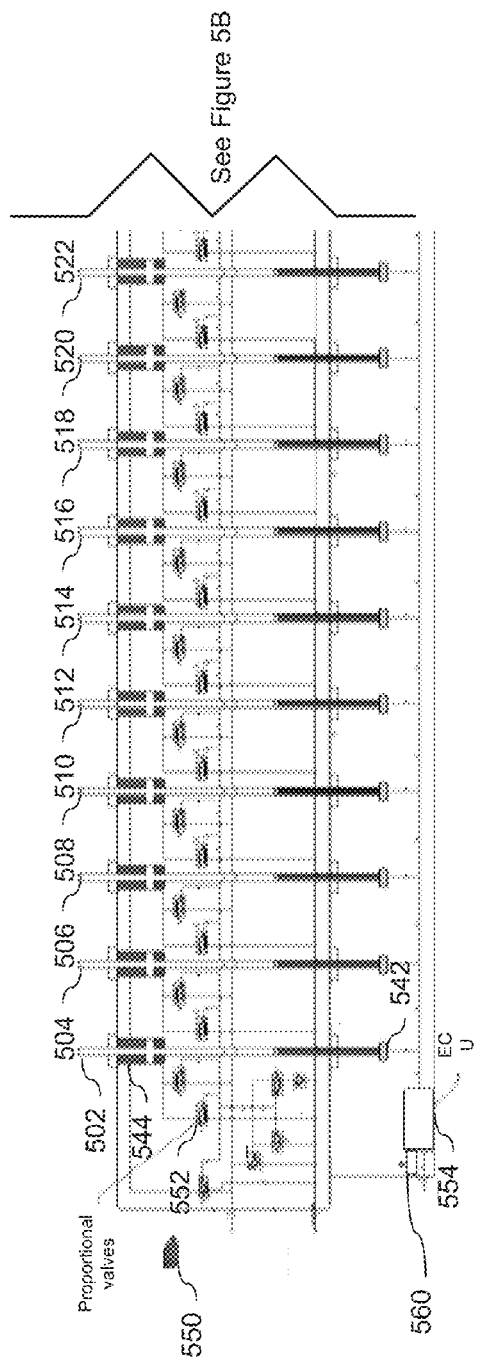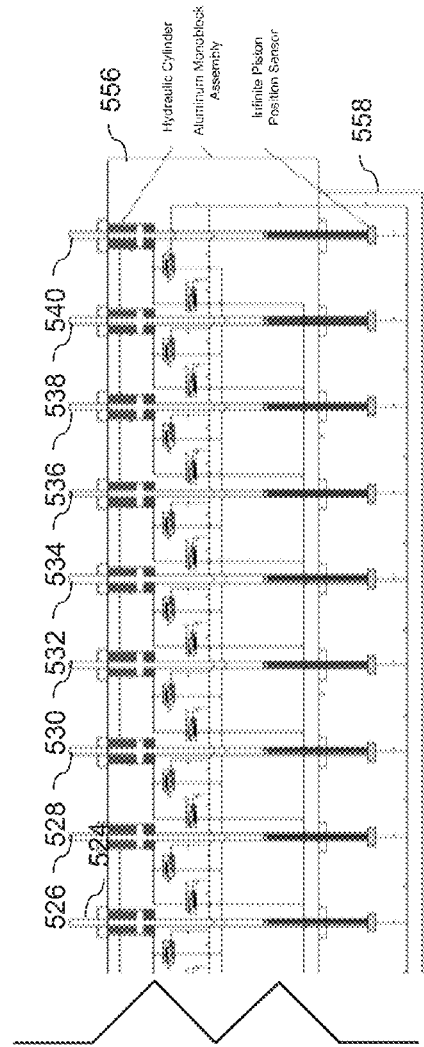

SLIDING FLOOR FOR CONTINUOUS MOVEMENT

CROSS-REFERENCE TO RELATED APPLICATIONS

This application claims priority under 35 U.S.C. §119(e) to Provisional Application No. 61/785,630, filed Mar. 14, 2013, which application is hereby incorporated herein by reference in its entirety.

BACKGROUND

A. Technical Field

This invention relates generally to techniques for moving a heavy load continuously by moving a supporting floor beneath the load and, more particularly, to techniques for moving a heavy load supported on a floor consisting of multiple movable slats. If, for example, all of the slats are moved together in one direction, the load will be carried in that direction, but if the slats are returned to their starting positions in smaller groups simultaneously containing only a fraction of the total number of slats, then the frictional forces between the load and a returning group of slats will be insufficient to move the load in the reverse direction. This invention relates specifically to the infinite control of the movement of the slats to achieve desired results in movement of the load.

B. Background of the Invention

Moving floors of this type have a number of useful applications, one of which is in the collection and disposal of garbage or waste. In large cities, long distances to disposal sites have resulted in the increased use of large transfer trailers, for the temporary storage of waste gathered by collection vehicles. When a transfer trailer is full, it is towed to a disposal site for emptying. Emptying such a vehicle by tipping is cumbersome and difficult if a large trailer is used, movable floors provide an ideal solution. Typically, a rear door of the trailer is opened and the waste material is ejected through the door by operation of the moving floor.

Another useful application of a moving floor of this type is in a warehouse setting where large loads, including loads on pallets, need to be moved or moved and loaded onto trucks or between trucks. Currently a forklift is used in a warehouse setting to move large pallet loads or load pallets onto a truck or between trucks.

Systems in use prior to the present invention are sometimes referred to as "walking" floors and operate by moving all of the slats in the desired direction as far as they can travel, and then returning each slat one group at a time. These systems incorporate relatively simple hydraulic control techniques and, when a hydraulic cylinder reaches the limit of its travel, the fluid flow from a hydraulic pump must be bypassed to a holding tank until valves can switch the cylinder in the appropriate direction. Furthermore, the load cannot move forward continuously, but either has to stop or move backward for part of the time.

The principal disadvantage of prior systems of this general type is that the load movement is started and stopped repeatedly, which is clearly inefficient and time consuming. Palletized loads cannot be effectively moved using prior systems due to the large amount of skew that occurs as a result of the starting and stopping of the load and the high percent of returning slats. The time to unload is at least twice as long as it would be if the load could move continuously. In addition there are hydraulic control system disadvantages, in that the oil tends to overheat due to the need for bypassing the pump at the end of all of the strokes before the hydraulic cylinders can switch. Moreover, rather large pump flow rates are required to gain reasonable speeds. The present invention overcomes all of these disadvantages.

SUMMARY OF THE INVENTION

Embodiments of the present invention overcome the disadvantages of the prior art moving floor systems by allowing the load to move forward continuously and without skew as experienced by prior art systems. Embodiments of the present invention reside in a moving floor than can move a load at the maximum possible speed, at the lowest cost and without any overheating of the oil in the system during prolonged operation. Embodiments of the invention accomplish these goals by combining a hydraulic subsystem, including hydraulic cylinders, a pump, and control valves, with infinite piston position sensors, and an electronic control unit. The hydraulic subsystem accomplishes the desired objectives by operating a moving floor in which a majority of the slats are always moving in the desired direction of load movement. The position sensors sense the position of the pistons relative to each other. The electronic control unit uses an infinite piston positioning feedback to control the movement of the hydraulic cylinders.

Embodiments of the present invention include a plurality of elongated floor slats movable in a direction parallel to the slats, and a hydraulic system for moving the slats in a reciprocating manner such that, at any instant during operation of the system, a majority of the slats are moving in the desired direction at a predetermined speed, and a minority of the slats are moving in the opposite direction at a higher speed, for example three times the speed. The load supported by the floor will tend to move in the direction of the majority of slower moving slats at all times when the floor is operating.

A plurality of hydraulic cylinder infinite piston position sensors provide electronic feedback to the electronic control unit, which commands the electronic proportional valves that accelerate, decelerate, and control varying oil flow rates that cause all four hydraulic cylinders to function independently to provide a continuous moving floor. Three staggered stroke hydraulic cylinders propel the payload at all times while one hydraulic cylinder is retracting and as each hydraulic cylinder reaches maximum extension, it retracts and the previously retracted cylinder extends to join the other two extending hydraulic cylinders.

Other objects and attainments together with a fuller understanding of the invention will become apparent and appreciated by referring to the following description and claims taken in conjunction with the accompanying drawings.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIGS. 5A and 5B shows a top view of mechanical, hydraulic and electronic components for a twenty slat system, in accordance with various aspects of the present invention.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
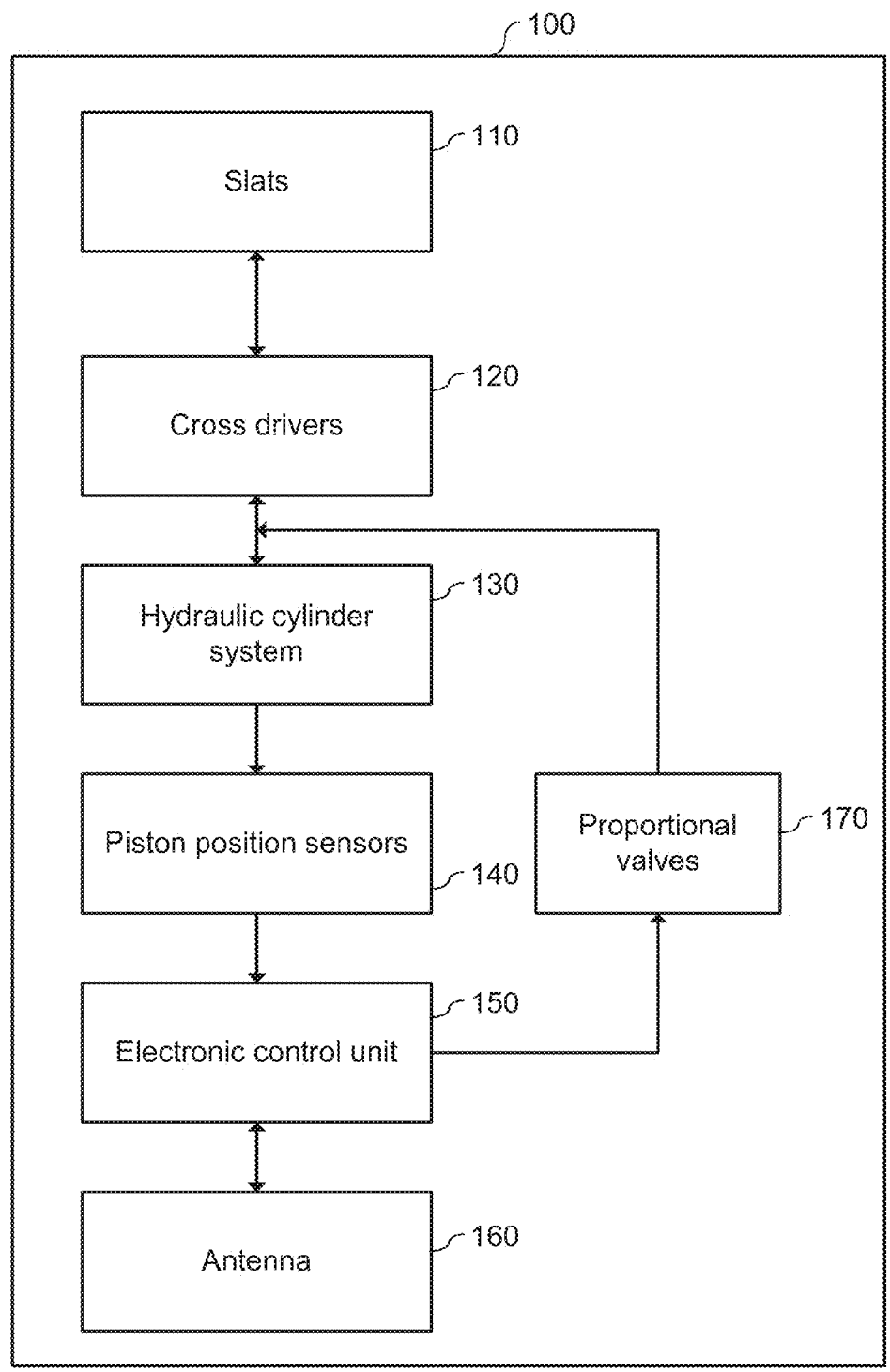
FIG. 1 shows a functional block, in accordance with various aspects of the present invention.

FIG. 1 shows a functional block, in accordance with various aspects of the present invention. As described in U.S. Pat. No. 4,739,463 issued Dec. 27, 1988 and entitled "Multiphase Sliding Floor For Continuous Material Movement" ("the '468 patent") and incorporated herein by reference, a load is moved on a movable floor in a practically continuous manner, since the majority of the slats are always moving in a desired direction. This continuity of operation provides a much more efficient and rapid load movement and also results in a more efficient hydraulic subsystem design.

In an embodiment of the present invention, a four slat moving floor system is used. In a four slat moving floor system, three of the four slats are moving in the desired direction and only one slat is moving in the direction opposite the desired direction. Therefore, the load being moved by the moving floor system is continuously moving in the desired direction. The slats are moved using hydraulic cylinders containing pistons. The present invention uses infinite piston positioning feedback to control the movement of the pistons and, therefore, the movement of the slats in the system.

As shown in FIG. 1, movable floor 100 comprises a number of slats 110. The slats 110 are movable and are mounted for movement in a desired direction (forward) and a direction opposite the desired direction (backward). For purpose of illustration a four slat moving floor example is used. However, it will be understood by one of ordinary skill in the art that the system could comprise practically any number of slats.

In one embodiment, each slat 110 is mounted on a cross driver 120 for mechanical support. However, the cross drivers 120 are heavy and are mounted with large screws that can cause mechanical problems. Therefore, in one embodiment, the cross drivers 120 are not used.

The slats 110 are mechanically coupled to a hydraulic cylinder system 130. The hydraulic cylinder system 130 can comprise a plurality of hydraulic cylinders. Each hydraulic cylinder gets its power from pressurized hydraulic fluid. In one embodiment, the hydraulic fluid is oil. The hydraulic cylinder comprises a cylinder barrel housing a piston mechanically coupled to a piston rod. The barrel is closed on one end by the cylinder bottom (sometimes referred to as a cap) and the other end by the cylinder head (sometimes referred to as a gland) where the piston rod comes out of the cylinder. The piston divides the inside of the cylinder into two chambers, the bottom chamber (base end) and the piston rod side chamber (rod end). The hydraulic system also has a pump, which brings the fluid into the cylinder and a series of valves that control the flow of the fluid into the cylinder.

In one embodiment each slat is mechanically coupled to a hydraulic cylinder in the hydraulic cylinder system 130. In another embodiment, more than one slat is mechanically coupled to a hydraulic cylinder in the hydraulic cylinder system 130.

In one embodiment, each of the hydraulic cylinders incorporates an infinite piston position sensor 140. The piston position sensor 140 senses the position of a piston or the piston rod. Since the hydraulic cylinder system 130 contains a plurality of pistons, each piston has a piston position sensor 140. Therefore, the position of each piston can be determined and known relative to each other piston in the system.

The position of the pistons as sensed by the piston position sensors 140 is input into electronic control unit 150. Electronic control unit 150 is a control unit that uses infinite piston positioning feedback to control the position of each piston in the moving floor system 100. Based on information collected from the piston positioning sensors 140 and fed into the electronic control unit 150, the electronic control unit 150 sends signals to proportional valves 170. Proportional valves 170 can proportionally open and close to let control the flow of fluid to the cylinder.

In one embodiment, the electronic control unit 150 is electrically coupled to antenna 160. Antenna 160 permits remote operation of the moving floor. It will be understood by one of ordinary skill in the art that remote operation can be accomplished using a remote control of any sort including a smart phone, tablet, laptop, personal computer, automobile, truck, or any other type of control device.

Figure 2:
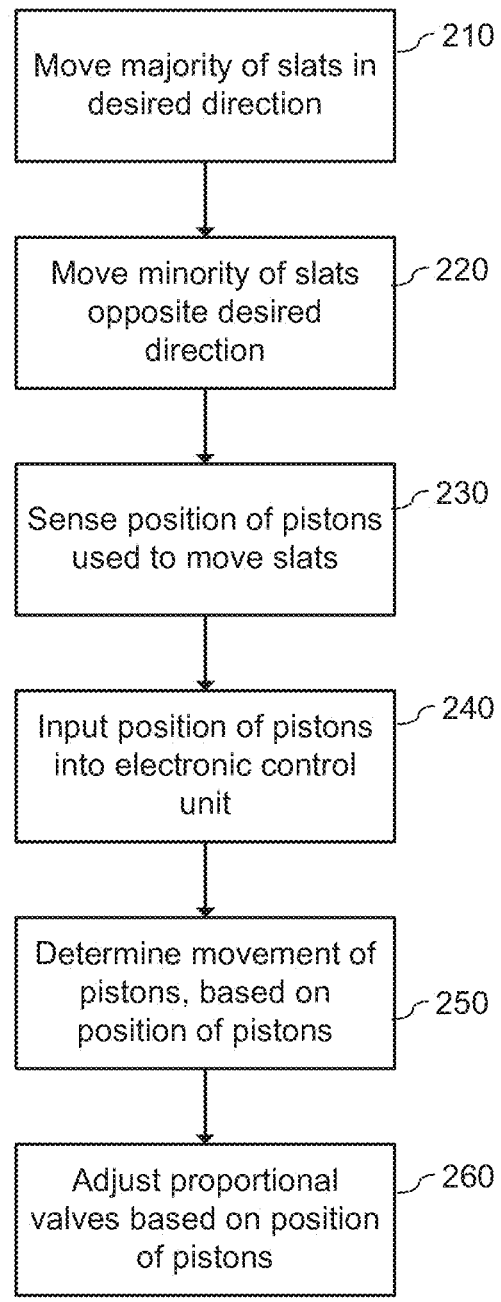
FIG. 2 shows a flowchart, in accordance with various aspects of the present invention.

FIG. 2 shows a flowchart, in accordance with various aspects of the present invention. FIG. 2 describes the process used in moving the moving floor system of FIG. 1. A majority of the slats are moved in the desired direction 210. A minority of the slats are moved in the opposite direction of the desired direction 220. For example, in the case of a four slat system, three slats are always moving forward while one slat is simultaneously moving backward. The control system of the present invention controls when the slats are moving forward and when it is moving backward.

FIG. 2 also shows sensing the position of the pistons that is used to move the slats 230. The position of the pistons is input into the electronic control unit 240. The movement of the pistons is determined based on the electronic control unit 250. The proportional valves are adjusted based on the position of the pistons 260.

Figure 3:
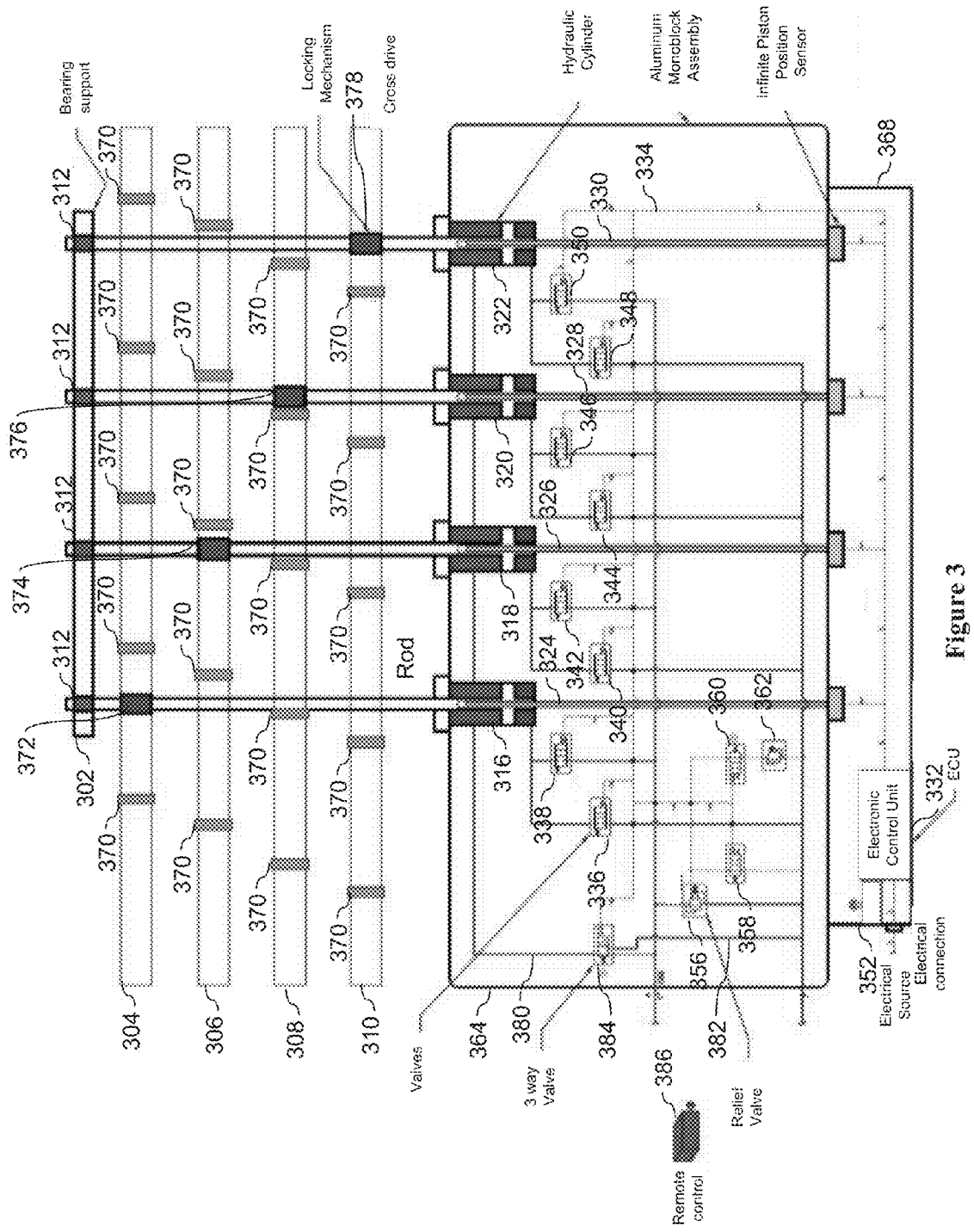
FIG. 3 shows a top view of mechanical, hydraulic and electronic components, in accordance with various aspects of the present invention.

FIG. 3 shows a top view of mechanical, hydraulic and electronic components, in accordance with various aspects of the present invention. FIG. 3 depicts a monoblock assembly 364. In one embodiment, the monoblock assembly 364 is made from an aluminum material. In one embodiment, the monoblock assembly 364 is a machined electroless nickel plated aluminum block that has roller burnished hydraulic cylinder bores and internal machined passages that eliminate fittings, hoses, hydraulic tubing, and tie rods. In one embodiment, a leakproof cover can be provided for the protection of the control valves, piston position sensors, antenna, and electronic control unit. In one embodiment, hydraulic pressure and return connections are SAE and o-ring flange type.

In the example shown in FIG. 3, the monoblock assembly 364 houses four cylinders 316, 318, 320, and 322. Each cylinder also contains a piston position sensor 324, 326, 328, and 330. In one embodiment, piston position sensors 324, 326, 328, and 330 sense movement of the rod as it extends and retracts. Piston position sensors 324, 326, 328, and 330 can operate in any manner such that the position of the piston is sensed. However, in one embodiment, piston position sensors 324, 326, 328, and 330 detect movement of the rod and vary a voltage accordingly. Therefore, any position can be detected and it can be detected continuously.

The ability to sense piston position at any point in time and position of the piston overcomes disadvantages of the prior art systems that can only sense the position of the piston at the end of a stroke. A typical position sensor for sensing only the end of stroke uses a poppet type device that is literally contacted by the piston as it extends and causes a valve to open and retracts the cylinder. The present invention overcomes disadvantages of using this poppet typed device by using the piston position sensor and can reduce shock tremendously.

In embodiment, within monoblock assembly 364 proportional valves 336, 338, 340, 342, 344, 346, 348, and 350 can adjust the flow of fluid into the cylinder in an analog fashion. The proportional valves allow the acceleration and deceleration of the pistons to be shaped such that they are smooth and therefore reduce shock. In one embodiment the proportional valves 336, 338, 340, 342, 344, 346, 348, and 350 are implemented using hydraulically controlled screw in cartridge valves that screw into the monoblock assembly 364. In one embodiment, proportional valves are solenoid operated directional valves to control the flow of oil to the cylinder. Any type of valve that can adequately control the flow of fluid into the cylinders can be used with the present invention. In one embodiment the fluid used is oil.

Valves 356 and 362 are high pressure and low pressure relief valves. Valves 358, and 360 are two way valves. Valve 384 can be a three way valve. Line 380 is a line showing the pressurized oil. Line 382 is a line showing returning oil back. As described in the '468 patent, the hydraulic system operates using a tank (not shown), a pump, (not shown), and a sequence of valves to control the flow of oil between the tank and the cylinders.

In one embodiment of the present invention, the moving floor system uses a regenerative system. In a regenerative system, rather than collecting oil into a tank when the cylinder extends, the oil removed from rod end is reused to be put back into the system at the base end and causes retracting cylinder to retract. An advantage of using a regenerative system on a moving floor is that pump volume can be reduced.

Due to the force of regenerative systems, there are occasions when the force is too low, for example when the floor is iced over. The floor can be installed on a trailer that can be kept outside and is subject to weather conditions of the outdoors, including freezing and icing. When the floor becomes iced over, a higher pressure can be needed to break the ice. Therefore, the moving floor system allows for use of a high pressure mode when necessary. Thus, the high pressure mode enables ice to be broken from the moving floor system. Once the ice is broken and the floor is moving, the moving floor system can switch back to the regenerative system.

FIG. 3 also shows cylinders 316, 318, 320 and 322 are mechanically coupled to four cross drivers 304, 306, 308, and 310. Cross drivers 304, 306, 308, and 310 are linked to the rods of cylinders 316, 318, 320 and 322 at connection points 372, 374, 376, and 378. Internal locking elements (not shown) can be used to lock the cross drivers 304, 306, 308, and 310 to the hydraulic cylinder rods, thus simplifying installation of the floor. Internal locking elements are wedge shaped tapered devices that slide onto the rod locking it in place. Slats (not shown) are mechanically coupled to cross drivers 304, 306, 308, and 310 at yokes 370. In one embodiment yokes 370 can be made of polyurethane lined aluminum. The slats can be mounted perpendicular to the cross drivers 304, 306, 308, and 310 and move in the same direction as the pistons.

In the embodiment shown in FIG. 3, twenty slats can be connected to the four cross drivers 304, 306, 308, and 310. In the embodiment shown five slats can be connected to each cross driver 304, 306, 308, and 310 resulting in each cylinder 316, 318, 320 and 322 moving five slats. As described above, each cylinder 304, 306, 308, and 310 will move the slats forward for part of the time and backward for part of the time, but with three cylinders moving slats forward and one cylinder moving slats backward.

FIG. 3 also shows bearing support 302, a mechanical structure used to support the rods when fully extended. The bearing support 302 is mechanically coupled to the rods at connection points 312.

FIG. 3 also shows an integrated hydraulics manifold 368. Integrated hydraulics manifold 368 houses the electronic control unit 332 and antenna 352. Antenna 352 permits control of the moving floor by remote control 386 as described with reference to FIG. 1. The integrated hydraulic manifold 368 can be physically mounted on the monoblock assembly 364 or it can be located separately. Electronic control unit 332 takes as input the positions of all the pistons in the system and the relative positions of the pistons and configures the control of the pistons such that the slats move in a desired fashion. The piston position sensors 324, 326, 328, and 330 are electrically coupled to the electronic control unit 332 by way of electrical connection 334. Electrical connection 334 can be a wired connection or a wireless connection using any available wired or wireless technologies.

For the purposes of simplicity of explanation, a four cylinder, four slat system will be described. However, one of ordinary skill in the art will appreciate that any number of cylinders and slats can be implemented. For ease of discussion, the four pistons will be referred to as P1, P2, P3, and P4. For example, based on the positions of the pistons, electronic control unit 332 can actuate P1 when it travels two inches, actuate P2, when P2 travels 2 inches, actuate P3 and retract P4. When P1 reaches the end, it reverses and P4 is actuated forward. It will be understood by those of skill in the art that any appropriate distance can be used other than two inches.

Using the combination of the piston position sensors 324, 326, 328, and 330, the electronic control unit 332, and the proportional valves 336, 338, 340, 342, 344, 346, 348, and 350 permits the infinite feedback control system to operate. Using the infinite feedback control system has the advantages of moving the load faster and keeping it continuously moving, uses less horsepower, less fuel, lower pressure, less heat, and has less wear and tear than a traditional system.

Figure 4:
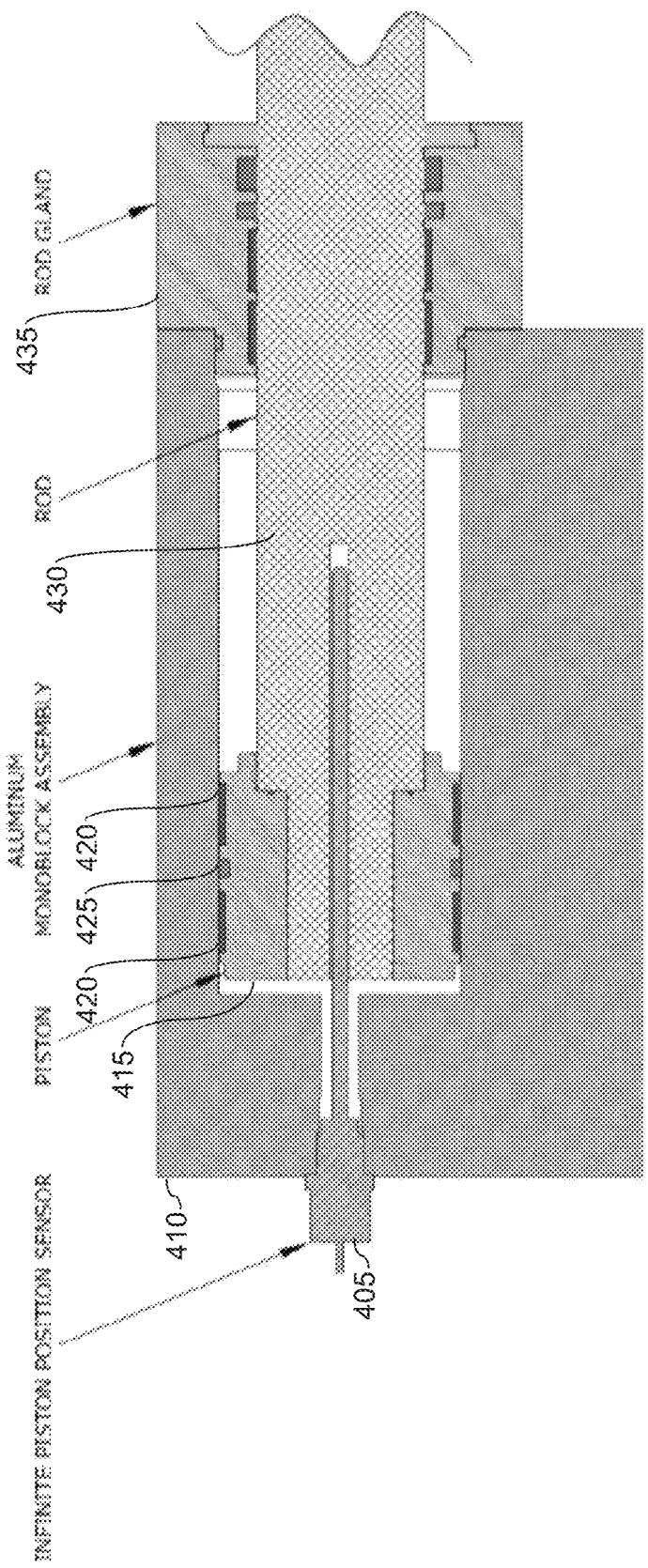
FIG. 4 shows a cross sectional view of an infinite piston position sensor, in accordance with various aspects of the present invention.

FIG. 4 shows a cross sectional view of a monoblock assembly 410 including an infinite piston position sensor 405, in accordance with various aspects of the present invention. FIG. 4 shows the piston position sensor 405 within the piston rod 430. In one embodiment, the piston position sensor is actually inserted in the rod as shown in FIG. 4. However, it will be understood that any infinite piston position sensor can be used. In one embodiment, a quarter inch diameter sensor is inserted into a hole in the piston rod and voltage changes to indicate position. The piston position sensor can sense very small changes in position. For example, for a six inch stroke, the piston position sensor can sense any change throughout the full stroke.

FIG. 4 also shows piston 415 mechanically coupled to piston rod 430. FIG. 4 also shows bearings 420, seals 425, and rod gland 435 that operate in conjunction with piston 415 in the hydraulic system to move the piston and seal the piston such to form a seal between one chamber of the cylinder and the other.

FIGS. 5A and 5B show a top view of mechanical, hydraulic and electronic components for a twenty slat system, in accordance with various aspects of the present invention. FIG. 5A shows part of the view and FIG. 5B shows the other part. The view was split between two figures for ease of capturing the view within the constraints of the size of the page. FIG. 5A continues in FIG. 5B as indicated in the figures. FIGS. 5A and 5B are similar to FIG. 3 in that they show cylinders 544, proportional valves 552, and piston position sensors 542 within monoblock assembly 556, and integrated hydraulics manifold 558 housing electronic control unit 554 and antenna 560. Both FIGS. 5A and B and FIG. 3 show a twenty slat moving floor system. One notable difference between FIGS. 5A and B and 3 is that FIGS. 5A and B shows twenty cylinders 544 each with a corresponding piston position sensor 542. Each cylinder 544 is mechanically coupled directly to a slat (not shown) without the use of a cross driver. There are several advantages of eliminating the need for a cross driver. One advantage is eliminating cross drivers can reduce the size of the cylinders. Additionally, cross drivers add a large amount of weight to the system and therefore reduce the amount of weight that can moved in the load. Furthermore, cross drivers are problematic due to bolts breaking and the need to access the middle of a trailer in order to repair them. Eliminating cross drivers can reduce the overall cost of the moving floor system.

The moving floor system shown in FIGS. 5A and B can effectively be considered to be the equivalent of five, four cylinder moving floor systems. The electronic control unit 554 receives piston position movement from all twenty pistons 544 and controls the movement of the pistons 544 such that at any given time fifteen of the pistons are moving forward and five of the pistons are moving backward.

It will be apparent to one of ordinary skill in the art that aspects of the present invention can be implemented as a software application running on a mobile device such as a mobile phone or a tablet computer.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

What is claimed is:

1. A system for moving a load, comprising:
   a plurality of elongated floor slats movable in a direction parallel to the slats;
   a plurality of hydraulic pistons mechanically coupled to the slats and configured to move the slats;
   a plurality of piston rods mechanically coupled to the piston;
   a plurality of infinite position sensors coupled to the pistons, each infinite position sensor inserted into one of the plurality of piston rods to sense voltage changes corresponding to position changes; and
   an electronic control unit, receiving input from the plurality of position sensors and controlling the movement of the plurality of pistons using infinite piston positioning such that a majority of the slats are movable in a desired direction and a minority of the slats are movable in a direction opposite the desired direction.

2. The system of claim 1, wherein there are four elongated floor slats.

3. The system of claim 1, wherein the speed of the slats is adjustable based on the input from the plurality of position sensors.

4. The system of claim 1, wherein the movement of the pistons is accomplished by varying a voltage sensed by the position sensors.

5. The system of claim 1, further comprising proportional valves coupled to the electronic control unit.

6. The system of claim 5, wherein the proportional valves are used to shape the acceleration profile of the slats.

7. The system of claim 1, wherein the system is a regenerative fluid system.

8. The system of claim 1, wherein the system uses oil.

9. The system of claim 1, wherein the system uses a high pressure mode.

10. The system of claim 1, further comprising a remote configured to remotely operate the system.

11. A method for moving a load, comprising:
    moving a majority of elongated floor slats in a desired direction using a plurality of hydraulic pistons;
    moving a minority of elongated floor slats in a direction opposite the desired direction;
    sensing position of the hydraulic pistons using a plurality of infinite position sensors each infinite position sensor inserted into one of a plurality of piston rods to sense voltage changes corresponding to position changes;
    controlling the movement of the slats based on the sensed position of the pistons using infinite piston positioning.

12. The method of claim 11, wherein there are four elongated floor slats.

13. The method of claim 11, wherein the speed of the slats is adjustable based on the input from the plurality of position sensors.

14. The method of claim 11, wherein the movement of the pistons is accomplished by varying a voltage sensed by the position sensors.

15. The method of claim 11, wherein the controlling the movement of the slats is achieved using proportional valves.

16. The method of claim 15, wherein the proportional valves are used to shape the acceleration profile of the slats.

17. The method of claim 11, wherein the method is performed in a regenerative fluid system.

18. The method of claim 11, wherein the method is performed using oil.

19. The method of claim 11, wherein the method is performed using a high pressure mode.

20. A system for continuously moving a load, comprising:
    a plurality of elongated floor slats configured to move in a desired direction and in a direction opposite the desired direction;
    a plurality of cross drivers mechanically coupled to the floor slats;
    a hydraulic cylinder system mechanically coupled to the cross drivers;
    a plurality of piston rods within the hydraulic cylinder system;
    a plurality of piston position sensors configured to sense the position of the pistons, each infinite position sensor inserted into one of the plurality of piston rods to sense voltage changes corresponding to position changes;

a plurality of proportional valves coupled to the hydraulic cylinder system configured to control the movement of a plurality of pistons within the hydraulic cylinder system; and an electronic control unit configured to control the movement of the slats, using infinite piston positioning, such that the load is continuously moving in the desired direction by adjusting the proportional valves.

* * * * *